United States Patent [19]

Schneider

[11] Patent Number: 5,277,241
[45] Date of Patent: Jan. 11, 1994

[54] LOST MODELING-COMPOUND CASTING PATTERN AND METHOD OF PREPARING IT

[75] Inventor: Wolfgang Schneider, Berlin, Fed. Rep. of Germany

[73] Assignee: Deutsche Babcock-Borsig AG, Berlin, Fed. Rep. of Germany

[21] Appl. No.: 927,126

[22] Filed: Aug. 7, 1992

[30] Foreign Application Priority Data

Oct. 12, 1991 [DE] Fed. Rep. of Germany ....... 4133923

[51] Int. Cl.⁵ ................................................ B22C 7/02
[52] U.S. Cl. ........................................ 164/45; 164/35; 164/246; 164/249; 264/22; 264/222; 264/317
[58] Field of Search ................. 164/45, 235, 245, 246, 164/249, 34, 35, 36; 264/22, 222, 317

[56] References Cited

U.S. PATENT DOCUMENTS 4,844,144  7/1989  Murphy et al. ............... 164/45 X

FOREIGN PATENT DOCUMENTS

| 2567668 | 1/1986 | France ........................ 164/45 |
| 43-17561 | 7/1968 | Japan ........................ 164/235 |
| 60-21174 | 2/1985 | Japan ........................ 164/235 |
| 3-174943 | 7/1991 | Japan ........................ 164/45 |
| 3-182312 | 8/1991 | Japan ........................ 164/45 |
| 642877 | 5/1984 | Switzerland ................. 164/235 |

*Primary Examiner*—J. Reed Batten, Jr.
*Attorney, Agent, or Firm*—Max Fogiel

[57] ABSTRACT

The shape-dictating surfaces of the pattern are constituted by a thin self-supporting shell (4 & 5) of photocured polymer. The shell is produced by a laser controlled by a computer with reference to a design drawing. The inside of the shell is packed full of low melting-point modeling compound. The areas (6 & 7) of the pattern that do not dictate shape are demarcated by the low melting-point modeling compound.

15 Claims, 2 Drawing Sheets

LOST MODELING-COMPOUND CASTING PATTERN AND METHOD OF PREPARING IT

BACKGROUND OF THE INVENTION

The invention concerns a lost modeling-compound casting pattern made of a low melting-point modeling compound for precision metal casting as well as a method of preparing the pattern.

Lost modeling-compound casting patterns are used for casting when the casts are complex and extreme precision is necessary. The pattern is made of a low melting-point modeling compound like wax, tin, bismuth, antimony. The patterns are cast and, once hardened, are packed in a box with sand or with a ceramic material and binder to produce a mold. The compound is melted out of the mold, leaving a cavity (Dubbel, Taschenbuch für den Maschinenbau, 14th ed., Springer, 1981, 946-49).

A simple method of preparing such a pattern without tools is stereolithography (U.S. Pat. No. 4,575,330), which depends on a laser controlled by a computer from a drawing (CAD). The laser's ultraviolet light is focused on a liquid monomer in a tub with a perforated plate that moves up and down. The light cures the monomer by polymerizing it into a solid that can no longer be liquified. The computer-controlled laser exploits the reaction to construct the shape represented in the drawing layer by layer on the perforated plate, which is slightly immersed in the tub of liquid. High-precision patterns can be prepared in this way. The method does have a drawback, however, in that a non-hollow pattern takes a long time to prepare because the length of the process depends on how much material is being cured. Furthermore, the photocuring polymer expands considerably before melting when the pattern is melted out of the mold. This process can burst the mold.

SUMMARY OF THE INVENTION

The object of the present invention is accordingly to stereolithograph a dimensionally precise lost modeling-compound casting pattern that will not burst the mold when it is melted out.

The areas decisive to the cast obtained from the pattern prepared or produced in accordance with the invention are high precision. The self-supporting shell of laser-cured polymer accommodates the low melting-point modeling compound. The compound melts rapidly enough to compensate for any heat expansion on the part of the shell. The mold is accordingly reliably prevented from bursting.

BRIEF DESCRIPTION OF THE DRAWINGS

Various embodiments of the invention will now be specified by way of example with reference to the drawing, wherein.

DESCRIPTION OF THE PREFERRED EMBODIMENTS

Figure 1:
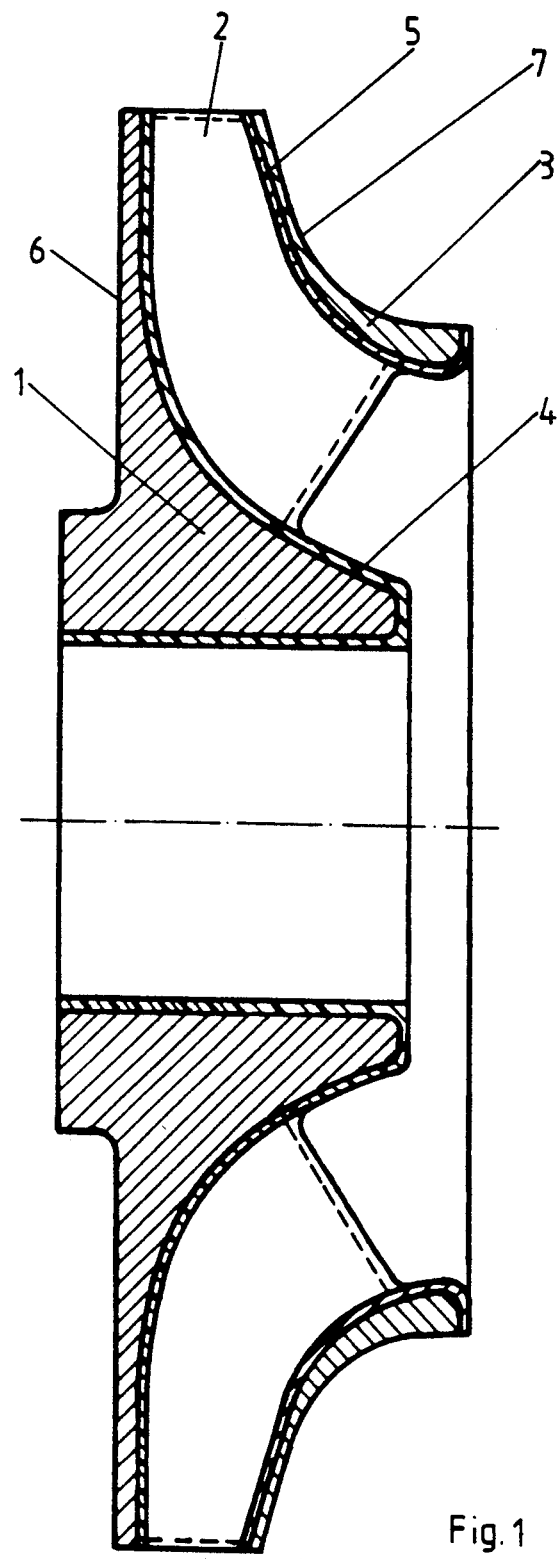
FIG. 1 is a longitudinal section through a pattern.

The illustrated pattern is for the rotor of a turbocompressor. Such rotors consist of a hub and a jacket with helical impellers between them. The hub, the jacket, and the impellers demarcate the rotor channel. A bore extends through the center of the hub to accommodate the compressors driveshaft. Area 1 in the drawing corresponds to the rotors hub, area 2 to the impellers, and area 3 to the jacket.

The pattern comprises a thin self-supporting shell 4 and 5 of photocuring polymer. Shell 4 and 5 is produced without tools, from a design drawing, by a computer-controlled laser that cures the liquid polymer in the known stereolithographic procedure hereintofore described. Shell half 4 demarcates the outside of hub 2 and shell half 5 the outside of jacket 3. The surfaces demarcated by shell 4 and 5 dictate the shape and will in turn demarcate the channel through the finished rotor.

The space demarcated by shell 4 and 5 is packed with enough low melting-point modeling compound to ensure that the ancillary areas 6 and 7 of the pattern will be demarcated by the surface of the compound. Ancillary areas 6 and 7 represent the surfaces of the hub and jacket averted from the channel in the finished rotor. The low melting-point modeling compound can be either wax or an alloy of bismuth and tin.

Figure 2:
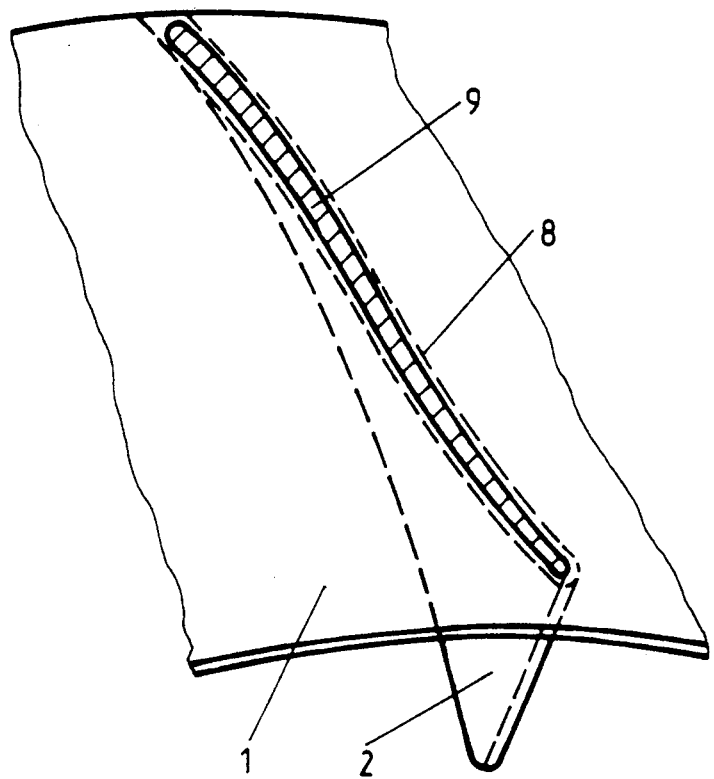
FIG. 2 is a top view of part of the pattern illustrated in FIG. 1.

The impellers can also be manufactured in the aforesaid way. As will be evident from FIG. 2, the area of the pattern that corresponds to impeller 2 comprises a shell 8 of photocuring polymer. The inside 9 of shell 8 is packed full of low melting-point modeling compound.

Figure 3:
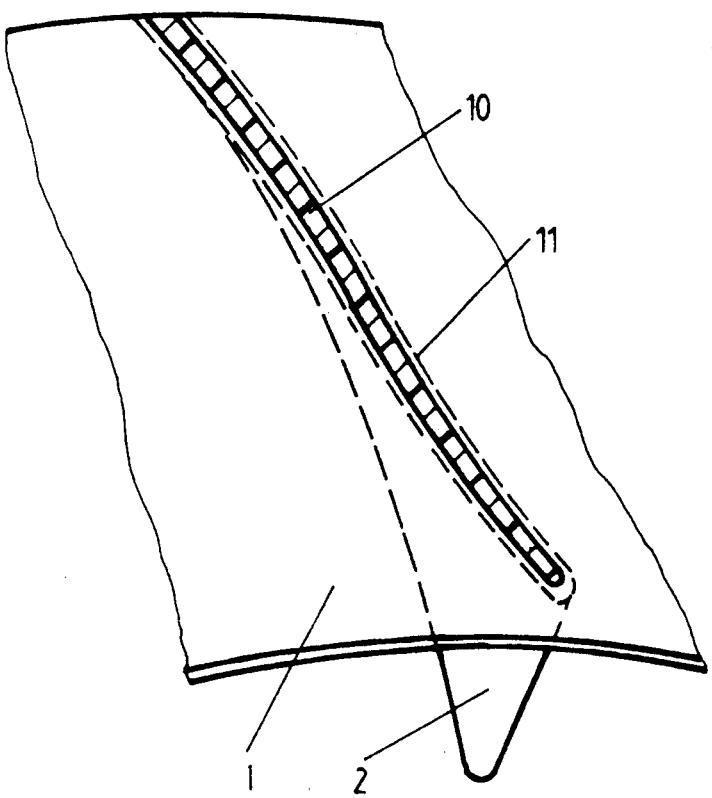
FIG. 3 is a top view of part of another embodiment.

Parts like the impellers 2 illustrated in FIG. 3 or like braces have very thin walls and cannot be produced hollow by the aforesaid method. The laser will in this event prepare a solid core 10 of photocuring polymer surrounded by a layer 11 of low melting-point modeling compound. In this case as well the thermal expansion of solid core 10 will be compensated for by the rapid liquification of the compound as it melts out.

I claim:

1. Lost modeling-compound casting pattern made of a modeling compound for precision metal casting, comprising: a thin self-supporting shell of photocured polymer forming shape-dictating surfaces of the pattern and produced by a laser controlled by a computer with reference to a design drawing; said shell having an interior packed full of modeling compound; said pattern having areas that do not dictate shape and are demarcated by said modeling compound.

2. A lost modeling-compound casting pattern as defined in claim 1, wherein said pattern has thin-walled parts comprising a solid core produced by the laser from photocured polymer and surrounded by a layer of modeling compound.

3. A lost modeling-compound casting pattern as defined in claim 1, wherein said modeling-compound is a low melting-point modeling-compound.

4. A lost modeling-compound casting pattern as defined in claim 1, wherein said modeling-compound comprises wax.

5. A lost modeling-compound casting pattern as defined in claim 1, wherein said modeling-compound comprises tin.

6. A lost modeling-compound casting pattern as defined in claim 1, wherein said modeling-compound comprises bismuth.

7. A lost-modeling-compound casting pattern as defined in claim 1, wherein said modeling-compound comprises antimony.

8. A lost modeling-compound casting pattern as defined in claim 1, wherein said modeling-compound comprises an alloy of bismuth and tin.

9. A method for preparing a lost modeling-compound casting pattern from a modeling compound for precision metal casting, comprising the steps of: generating with a laser shape-dictating surfaces of the pattern in form of a thin self-supporting shell of photocured polymer having an interior; controlling the laser by a computer with reference to a design drawing, said pattern having areas that do not dictate shape; and packing the interior of said shell full of modeling compound up to areas of the pattern that do not dictate shape.

10. A method as defined in claim 9, wherein said modeling-compound is a low melting-point modeling-compound.

11. A method as defined in claim 9, wherein said modeling-compound comprises wax.

12. A method as defined in claim 9, wherein said modeling-compound comprises tin.

13. A method as defined in claim 9, wherein said modeling-compound comprises bismuth.

14. A method as defined in claim 9, wherein said modeling-compound comprises antimony.

15. A method as defined in claim 9, wherein said modeling-compound comprises an alloy of bismuth and tin.

* * * * *